United States Patent
Eslami et al.

(10) Patent No.: US 10,127,497 B2
(45) Date of Patent: Nov. 13, 2018

(54) INTERFACE ENGINE FOR EFFICIENT MACHINE LEARNING

(71) Applicant: Microsoft Technology Licensing, LLC, Redmond, WA (US)

(72) Inventors: Seyed Mohammadali Eslami, Cambridge (GB); Daniel Stefan Tarlow, Cambridge (GB); Pushmeet Kohli, Cambridge (GB); John Winn, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 622 days.

(21) Appl. No.: 14/514,162

(22) Filed: Oct. 14, 2014

(65) Prior Publication Data

US 2016/0104070 A1    Apr. 14, 2016

(51) Int. Cl.
   *G06N 7/00* (2006.01)
   *G06N 5/04* (2006.01)
   *G06N 99/00* (2010.01)

(52) U.S. Cl.
   CPC ............. *G06N 5/04* (2013.01); *G06N 7/005* (2013.01); *G06N 99/005* (2013.01)

(58) Field of Classification Search
   CPC .................................................. G06N 7/005
   USPC ......................................................... 706/46
   See application file for complete search history.

(56) References Cited

U.S. PATENT DOCUMENTS

| 6,687,887 B1 | 2/2004 | Teig et al. |
| 7,657,102 B2 | 2/2010 | Jojic et al. |
| 8,229,221 B2 | 7/2012 | Le Roux et al. |
| 2005/0181386 A1 | 8/2005 | Diamond et al. |

OTHER PUBLICATIONS

Li et al ("Confidence-Based Active Learning" 2006).*
Devetyarov ("Prediction with Confidence Based on a Random Forest Classifier" 2010).*
Murasaki et al ("Adaptive Human Shape Reconstruction via 3D Head Tracking for Motion Capture in Changing Environment" 2011).*
Qi et al ("Two-Dimensional Multilabel Active Learning with an Efficient Online Adaptation Model for Image Classification" 2009).*
Li et al ("Confidence based Dynamic Ensemble for Image Annotation and Semantics Discovery" 2003).*
Scheme et al ("Confidence-Based Rejection for Improved Pattern Recognition Myoelectric Control" IEEE 2013).*

(Continued)

*Primary Examiner* — Lut Wong

(57) ABSTRACT

An inference engine is described for efficient machine learning. For example, an inference engine executes a plurality of ordered steps to carry out inference on the basis of observed data. For each step, a plurality of inputs to the step are received. A predictor predicts an output of the step and computes uncertainty of the prediction. Either the predicted output or a known output is selected on the basis of the uncertainty. If the known output is selected, the known output is computed, (for example, using a resource intensive, accurate process). The predictor is retrained using the known output and the plurality of inputs of the step as training data. For example, computing the prediction is fast and efficient as compared with computing the known output.

20 Claims, 8 Drawing Sheets

(56) References Cited

OTHER PUBLICATIONS

Castellini et al ("Proceedings of the first workshop on Peripheral Machine Interfaces: going beyond traditional surface electromyography" Aug. 2014).*
"National Agricultural Statistics Service", Aug. 19, 2014 Available at: http://quickstats.nass.usda.gov/.
Barthelme, et al., "ABC-EP: Expectation Propagation for Likelihood-free Bayesian Computation", In Proceedings of the 28th International Conference on Machine Learning, Jun. 28, 2011, 8 pages.
Caldararu, et al., "Filzbach", Aug. 19, 2014 Available at: http://research.microsoft.com/en-us/projects/filzbach/.
Criminisi, et al., "Decision Forests for Computer Vision and Medical Image Analysis", In Proceedings of Advances in Computer Vision and Pattern Recognition, Jan. 2013, 3 pages.
Goodman, et al., "Church: A Language for Generative Models", In Proceedings of the Computing Research Repository Jun. 2012, 10 pages.
Grosse, et al., "Annealing Between Distributions by Averaging Moments", In Proceedings of Advances in Neural Information Processing Systems, Dec. 5, 2013, 9 pages.
Heess, et al., "Learning to Pass Expectation Propagation Messages", In Proceedings of Advances in Neural Information Processing Systems, Dec. 5, 2013, 9 pages.
Ihler, et al., "Message Errors in Belief Propagation", In Proceedings of Advances in Neural Information Processing Systems, Dec. 13, 2004, 8 pages.
Lewis, et al., "A Sequential Algorithm for Training Text Classifiers", In Proceedings of the 17th Annual International ACM-SIGIR Conference on Research and Development in Information Retrieval, Jul. 3, 1994, 10 pages.
Li, et al., "Knows What it Knows: A Framework for Self-Aware Learning", In Proceedings of the 25th International Conference on Machine Learning, Jul. 5, 2008, 8 pages.
Lobell, et al., "Nonlinear Heat Effects on African Maize as Evidenced by Historical Yield Trials", In Journal of Nature Climate Change, vol. 1, No. 1, Mar. 13, 2011, 4 pages.
Minka, Thomas P., "Expectation Propagation for Approximate Bayesian Inference", In Proceedings of the 17th Conference in Uncertainty in Artificial Intelligence, Aug. 2, 2001, 8 pages.
"Infer.NET", Aug. 19, 2014 Available at: http://research.microsoft.com/infernet.
Munoz, Daniel, "Inference Machines: Parsing Scenes via Iterated Predictions", In Technical Report CMU-RI-TR-13-15, Jun. 6, 2013, 147 pages.
Munoz, et al., "Stacked Hierarchical Labeling", In Proceedings of the 11th European conference on Computer vision: Part VI, Sep. 5, 2010, 15 pages.
Ross, et al., "Learning Message-Passing Inference Machines for Structured Prediction", In Proceedings of 24th IEEE Conference on Computer Vision and Pattern Recognition, Jun. 20, 2011, 9 pages.
Schlenker, et al., "Nonlinear Temperature Effects Indicate Severe Damages to U.S. Crop Yields Under Climate Change", In Proceedings of the National Academy of Sciences of the United States of America, vol. 106, Sep. 15, 2009, 5 pages.
Shapovalov, et al., "Spatial Inference Machines", In Proceedings of IEEE Conference on Computer Vision and Pattern Recognition, Jun. 23, 2013, 8 pages.
Smith, et al., "Changing How Earth System Modelling is Done to Provide more Useful Information for Decision Making, Science and Society", In Proceedings of Bulletin of the American Meteorological Society, Feb. 2014, 36 pages.
"Stan: A C++ Library for Probability and Sampling", Aug. 19, 2014 Available at: https://www.zotero.org.gombin/items/itemKey/TUCNM988.
Stuhlmuller, et al., "Learning Stochastic Inverses", In Proceedings of Advances in Neural Information Processing Systems, Dec. 5, 2013, 9 pages.
Domke, Justin, "Parameter learning with truncated message-passing", In IEEE Conference on Computer Vision and Pattern Recognition, Jun. 20, 2011, 7 pages.
Domke, Justin, "Learning graphical model parameters with approximate marginal inference", In IEEE Transactions on Pattern Analysis and Machine Intelligence, vol. 35, Issue 10, Oct. 1, 2013, 22 pages.
Herbrich, et al., "Trueskill: A Bayesian skill rating system", In Proceedings of Advances in Neural Information Processing Systems, Jan. 2007, 8 pages.
Minka, Thomas P., "A family of algorithms for approximate Bayesian inference", In Thesis of Doctor of Philosophy in Computer Science and Engineering, Jan. 2001, 75 pages.
Minka, et al., "Gates: A graphical notation for mixture models", In Proceedings of Advances in Neural Information Processing Systems, Dec. 5, 2008, 16 pages.
Rubin, Donald B., "Bayesianly justifiable and relevant frequency calculations for the applies statistician", In Proceedings of the Annals of Statistics, vol. 12, No. 4, Dec. 1984, 22 pages.
Stern, et al., "Matchbox: Large scale online Bayesian recommendations", In Proceedings of the 18th International World Wide Web Conference, Apr. 20, 2009, 10 pages.
Wingate, et al., "Nonstandard interpretations of probabilistic programs for efficient inference", In Proceedings of Advances in Neural Information Processing Systems 24, Dec. 12, 2011, 9 pages.
Wingate, et al., "Automated variational inference in probabilistic programming", In Proceedings of the Computing Research Repository, Jan. 2013, 7 pages.
Torralba, et al., "Contextual Models for Object Detection using Boosted Random Fields", In Proceedings of in Proceedings of Advances in Neural Information Processing Systems 17, Dec. 13, 2004, 8 pages.
Wang, et al., "Hybrid in-Database Inference for Declarative Information Extraction", In Proceedings of the ACM SIGMOD International Conference on Management of data, Jun. 12, 2011, 12 pages.
Papandreou, et al., "Bayesian Inference in Large-Scale Sparse Models: Efficient Monte-Carlo and Variational Approaches", Aug. 13, 2014 Available at: http://ttic.uchicago.edu/~gpapan/research/sparse_bayes/.
Murphy, et al., "Linear Time Inference in Hierarchical HMMs", In Proceedings of Advances in Neural Information Processing Systems, Dec. 3, 2001, 8 pages.

* cited by examiner

INTERFACE ENGINE FOR EFFICIENT MACHINE LEARNING

BACKGROUND

Machine learning is used in many application domains including natural user interface technology, crowdsourcing, information retrieval, augmented reality, recommendation systems and others. Large amounts of observed data are increasingly available and may be used by inference engines to improve performance of downstream systems and to make accurate predictions.

Inference algorithms used by inference engines are often complex, computationally expensive and/or time consuming.

The embodiments described below are not limited to implementations which solve any or all of the disadvantages of known inference engines or machine learning systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

An inference engine is described for efficient machine learning. For example, an inference engine executes a plurality of ordered steps to carry out inference on the basis of observed data. For each step, a plurality of inputs to the step are received. A predictor predicts an output of the step and computes uncertainty of the prediction. Either the predicted output or a known output is selected on the basis of the uncertainty. If the known output is selected, the known output is computed, (for example, using a resource intensive, accurate process). The predictor is retrained using the known output and the plurality of inputs of the step as training data. For example, computing the prediction is fast and efficient as compared with computing the known output.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
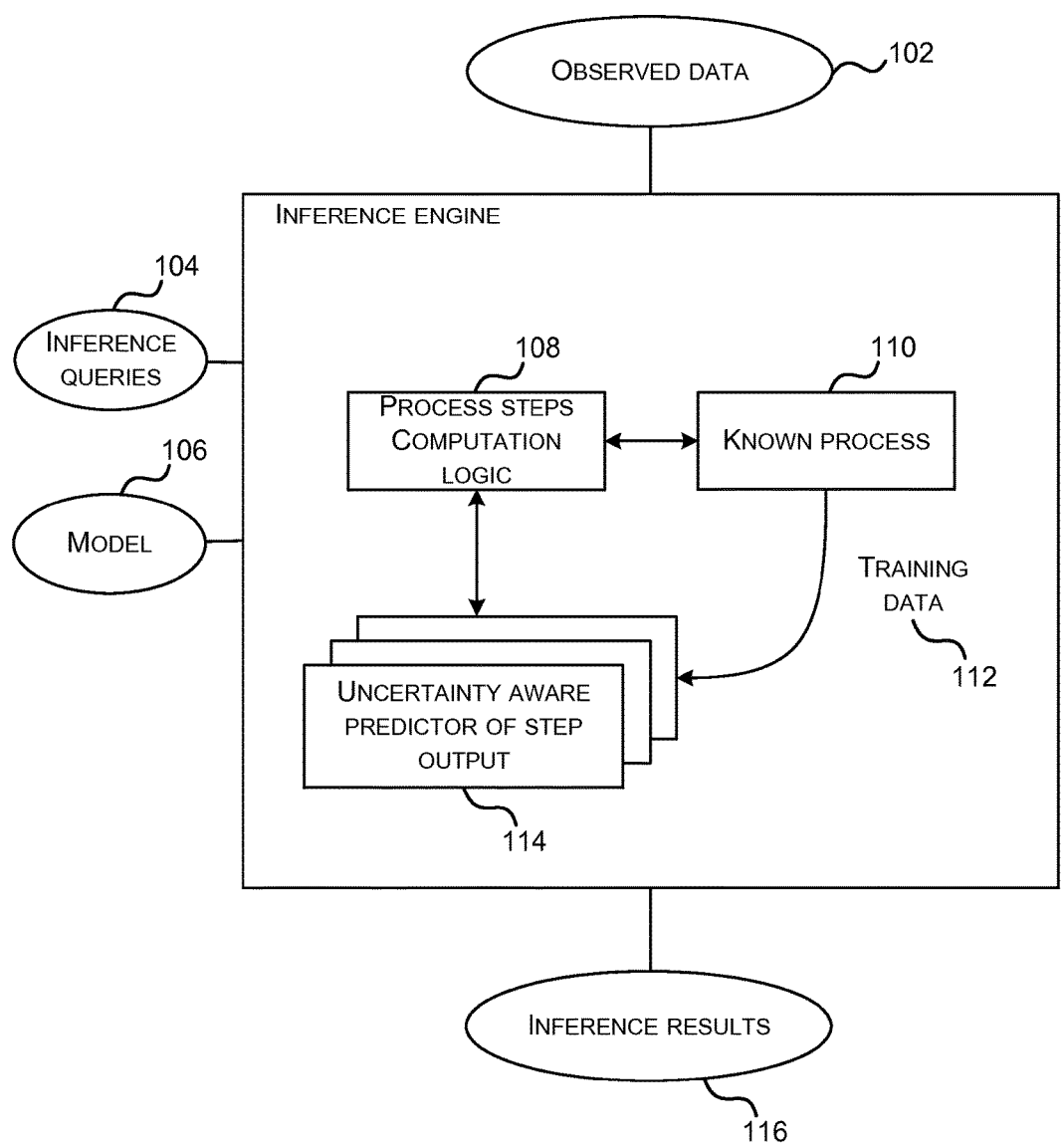
FIG. 1 is a schematic diagram of an inference engine for computing inference results from observed data.

FIG. 1 is a schematic diagram of an inference engine 100 for computing inference results 116 from observed data 102. The inference engine uses machine learning technology to learn from the observed data 102. For example, the observed data can be sensor data such as images captured by an image capture device, observations of events such as information retrieval query events, observations of product purchases, environmental observations such as temperature, light levels, humidity, observations of crop yields, observations of sports game outcomes and others.

In some examples the inference engine 100 uses a model 106 describing how the observed data 102 is generated. For example, the model may be a probabilistic graphical model or any other model describing how the observed data is generated. In an example where the inference engine is a pose tracker for tracking high dimensional pose of human hands or other objects from image data, the model may be a 3D model of the object and a renderer which is able to calculate synthetic images from the 3D model.

In some examples, such as where the model 106 is a probabilistic model, the inference engine 100 receives inference queries 104 as input.

The inference engine 100 uses inference algorithms in order to learn from the observed data 102. The inference algorithms comprise a plurality of ordered process steps 108. The process steps can be carried out using one or more known processes (FIG. 1 shows one known process 110 for clarity). The known process is often computationally expensive but is referred to here as a "known" process because the results of the process can be relied on as being relatively accurate.

The inference engine 100 is able to speed up execution of the process steps 108 using one or more uncertainty aware predictors 114. An individual uncertainty aware predictor is trained in an online fashion during operation of the inference engine 100. An individual uncertainty aware predictor is able to predict an output of an individual one of the process steps 108 by learning associations between inputs to the process step and outputs from the process step. When an uncertainty aware predictor 114 is presented with process step inputs which it has not seen before, it is able to generalize from the examples it has seen before, to produce a good prediction of the outputs of the process step that would be generated by the known process 110. In this way, the computationally expensive known process can be replaced by the efficient use of the uncertainty aware predictor. Operation of an individual uncertainty aware predictor at test time (to produce a prediction for inputs to a process step) is computationally inexpensive as compared with the known process 110. Thus by using the uncertainty aware predictors the inference engine is able to significantly increase the speed of its operation without increasing the amount of computing resources used. The inference engine is also able to operate on computing devices which are more resource constrained than has previously been possible. For example, smart phones, wearable computing devices, and tablet computers.

As mentioned above, an individual uncertainty aware predictor is trained in an online fashion during operation of the inference engine 100. This is done by using training data 112 comprising (process step input-known process output) pairs. For example, each time the known process 110 is executed, the output from the known process is used together with the process step inputs, to update the uncertainty aware predictor. In this way, the inference engine may begin by using the known process 110 for the majority of the process steps 108 and gradually, as learning progresses, the proportion of the process steps 108 for which the known process 110 is used, reduces.

In another example, batches of data from the known process 110 are saved and used to train the uncertainty aware predictor in batch-mode training. In some examples the outputs of the known process 110 are stored and used to train the predictor 114 in an offline process whilst the inference engine is not in operation.

In some examples the inference engine chooses, for an individual process step, whether to use the known process or whether to use a prediction of one of the uncertainty aware predictors 114. For example, the inference engine obtains a prediction from the predictor and also obtains uncertainty of the prediction from the predictor. Using the uncertainty data it decides whether to use the prediction or to calculate a good output from the known process 110.

In some examples an uncertainty aware predictor comprises a combination of a first predictor for predicting the output of the known process and a second predictor for predicting uncertainty of the prediction of the known process. The first predictor and the second predictor may be of different types. For example, the first predictor may be a random decision forest and the second predictor may be a support vector machine or a Gaussian process interpolator. Other combinations of different types of predictor may be used. The first predictor and the second predictor are trained using the same training data.

In some examples, where the uncertainty aware predictors have been fully trained, the inference engine only uses the predictors and is able to omit use of the known process 110.

The functionality of the inference engine can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
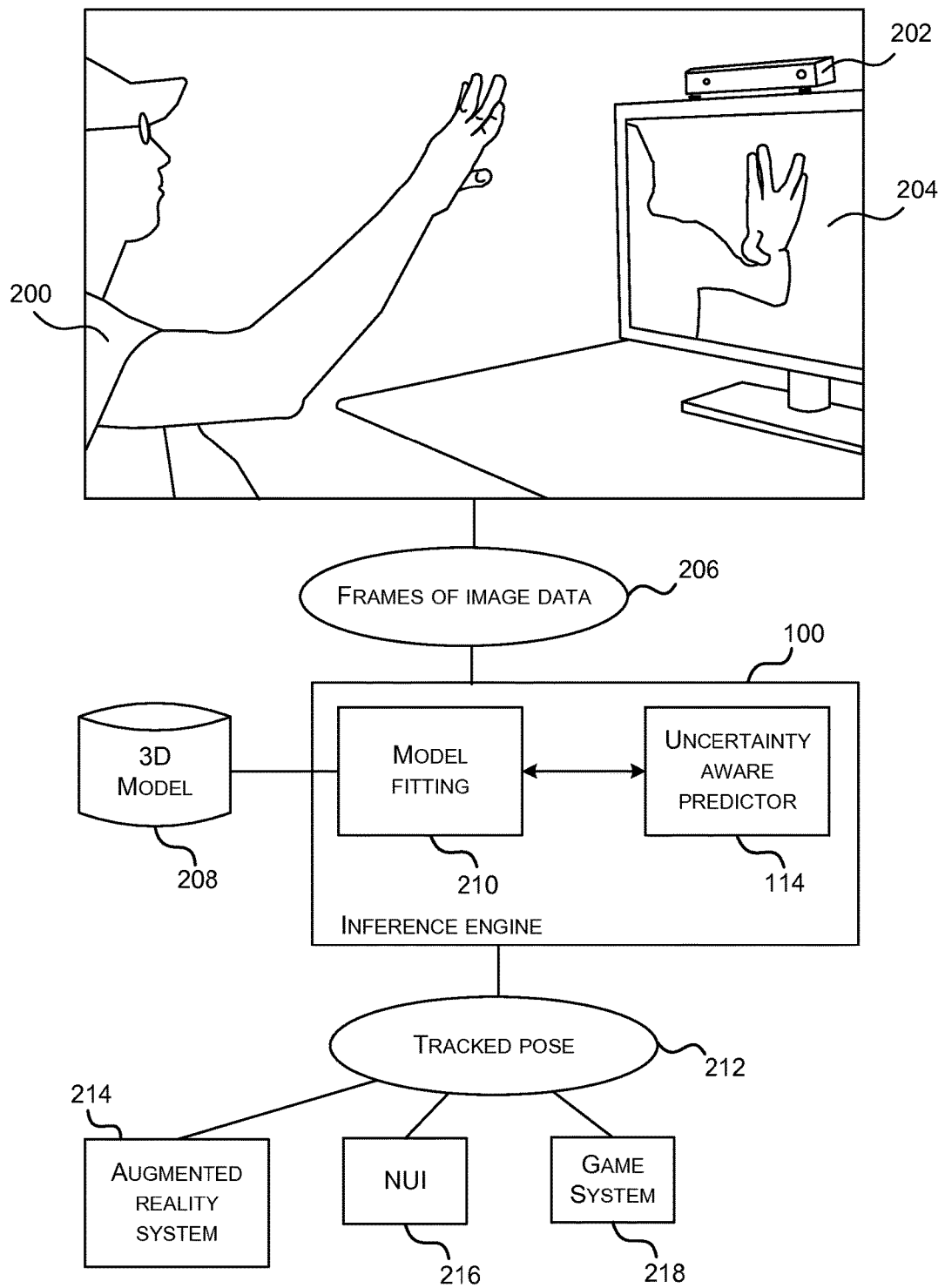
FIG. 2 is a schematic diagram of an inference engine used to track pose of a user's hand from captured frames of image data.

FIG. 2 is a schematic diagram of an inference engine used to track pose of a user's hand from captured frames of image data. For example, the inference engine comprises a model fitting component 210 and an uncertainty aware predictor 114. The model fitting component 210 is made more efficient by using the uncertainty aware predictor 114. The model fitting component 210 implements an example of known process 110 of FIG. 1.

Although this example is described with reference to tracking pose of a user's hand it is also applicable to tracking pose of other objects such as bodies, coffee mugs, animals, legs, or other articulated or non-articulated objects or parts of objects. The term "pose" is used to refer to an orientation and translation of the object being tracked, as well as articulation parameters in the case that the object is an articulated object such as a hand. The articulation parameters can be joint angles of a kinematic model of the object.

A capture device 202 captures frames of image data 206 of the user's 200 hand in the environment. For example, the capture device 202 is one or more of: a time of flight camera, a color video camera, a stereo camera. In this example the capture device is located in front of the user on top of a display screen 204. However the capture device can be in other locations. The frames of image data 206 are input to the inference engine 100 which comprises at least an iterative model fitting process 210 and an uncertainty aware predictor 114.

The model fitting component 210 searches for a pose of the user's hand which enables a 3D model of a hand 208 to fit well to a frame of image data 206. For example, the iterative model fitting component 210 comprises a renderer which, given a candidate pose, computes a synthetic image from the 3D model. The synthetic image is compared with the observed frame of data to assess how good the candidate pose is.

In the example of FIG. 2 the process whereby the model fitting component 210 fits a frame of image data 206 to the 3D model may be one of the process steps of FIG. 1. That is, an individual process step 108 of FIG. 1 can comprise fitting a frame of image data to the 3D model.

Fitting a frame of image data to the 3D model is computationally expensive because the number of possible pose solutions to be searched is high and because the process for assessing whether a pose solution is good or not is itself computationally expensive. For example, the assessment comprises rendering a synthetic image and computing a distance metric between the synthetic image and the observed frame of image data.

The uncertainty aware predictor 114 acts as in FIG. 1 to replace a process step (model fit to a frame of data in this example) by making a prediction of the pose directly from the frame of data. The predictor 114 operates in a fast, efficient manner as compared with the model fitting process. The uncertainty aware predictor 114 in this example may be for example, a neural network, a support vector machine, a random decision forest, a jungle of directed acyclic graphs, an ensemble of ferns. An example in which a random decision forest is used is described below with reference to FIGS. 5 and 6.

The pose tracker 100 outputs tracked pose 212 of the user's hand (or other object being tracked) and the output pose is used to control one or more downstream systems such as an augmented reality system 214, a natural user interface 216 or a game system 218.

In some examples, the process steps 108 of FIG. 1 are steps of an inference algorithm. For example, a probabilistic inference algorithm which updates probabilistic variables of a model such as a probabilistic graphical model or other probabilistic model. During execution of the inference algorithm one or more of the process steps may be replaced by making predictions using the uncertainty aware predictor. For example, where the inference algorithm steps comprise message update computations of a message passing algorithm, these are often computationally expensive. For example, where general message update computations are used rather than hand crafted efficient message update computations. The uncertainty aware predictor may receive as input features of messages input to a specified type of computation node of a probabilistic graphical model and may predict messages output by the probabilistic graphical model in response to the inputs. The process of computing the predicted messages using the uncertainty aware predictor is more efficient than a known process of using widely applicable message passing update processes. In this way efficiencies are achieved and the resulting inference engine may be implemented on computing devices which are more resource constrained than before.

Figure 3:
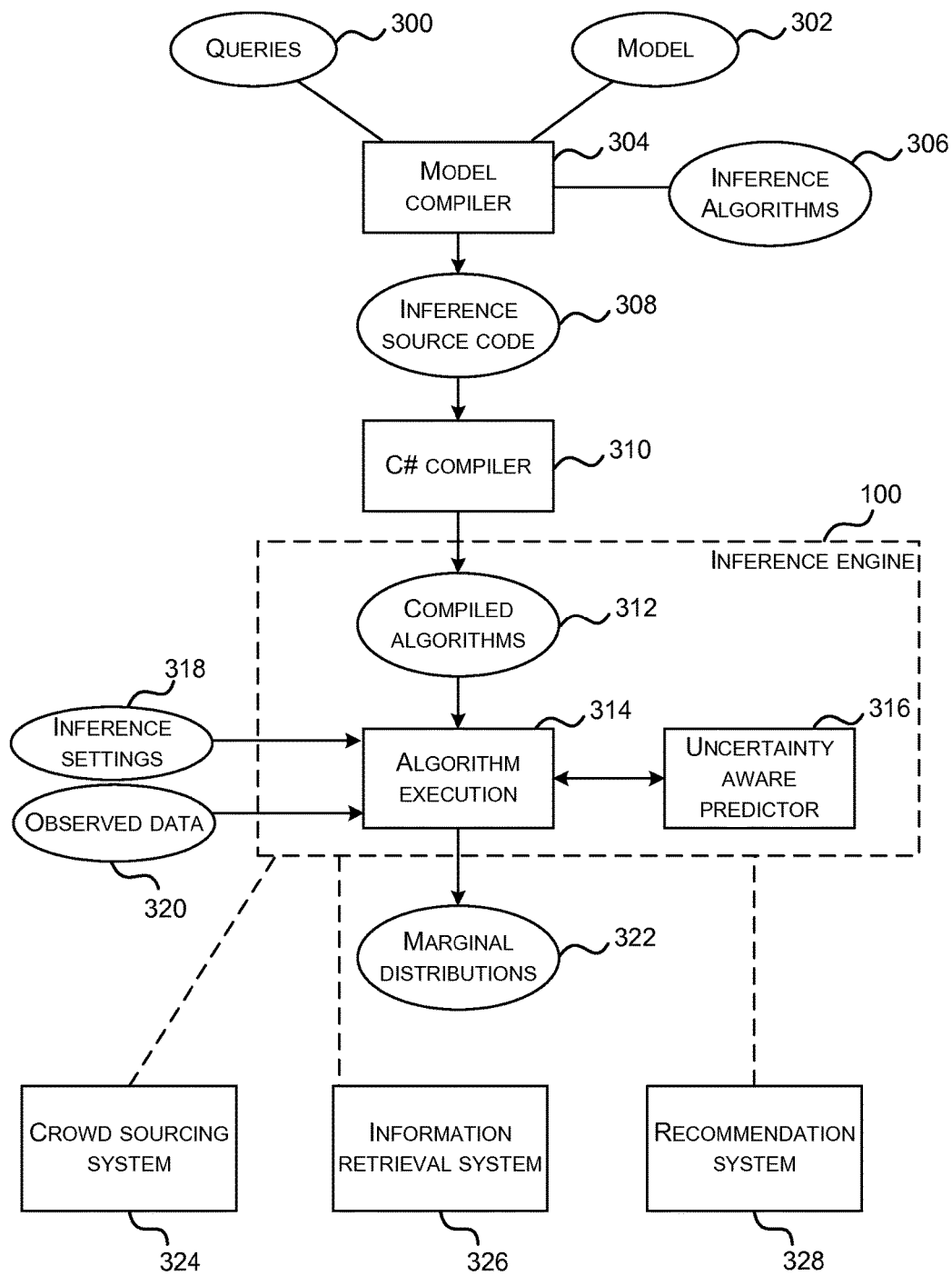
FIG. 3 is a schematic diagram of an inference engine at least part of which is used in any of: a crowdsourcing system, an information retrieval system, a recommendation system.

FIG. 3 is an example of the inference engine 100 of FIG. 1 in the case that the process steps 108 are steps of a probabilistic inference algorithm. The inference engine 100 comprises at least one uncertainty aware predictor 316 which is an example of the uncertainty aware predictor 114 of FIG. 1. The inference engine 100 comprises a compiled inference algorithm 310. This compiled inference algorithm comprises algorithm steps which are an example of the process steps 108 of FIG. 1.

In some examples inference source code 308 is compiled automatically by a model compiler 304. The model compiler 304 uses a library of general inference algorithms 306 which are each examples of the known process 110 of FIG. 1. An example of a general inference algorithm uses a Monte Carlo process which is time consuming and complex to compute. In some examples, the model compiler takes as input a probabilistic graphical model 302 comprising a plurality of variable and factor nodes linked by edges. It also takes as input one or more inference queries 300. The model compiler translates the graphical model 302 into inference source code 308 by using appropriate ones of the inference algorithms to implement computations carried out by factor nodes of the graphical model. Because the inference source code is automatically generated by the model compiler 304 the inference algorithms used in the source code (from the library of inference algorithms 306) may not be the most efficient algorithms, because efficient algorithms typically need to be hand written for the particular task and are not available. The inference source code 308 may comprise one or more schedules of message passing operations. A message passing operation is a computation which takes probabilistically defined variables as input and computes a probabilistically defined output.

In some examples the inference source code 308 is compiled by a compiler such as a C# compiler to create compiled algorithm 312 suitable for execution on a computing device such as a tablet computer, wearable computer, smart phone, personal computer, web server, data center, or other computing platform.

At the inference engine 100 the compiled algorithm is executed 314 to compute updates to marginal distributions 322 of probabilistic variables of the model 302, the updates being made in the light of observed data 320 and using inference settings 318. During the execution computationally expensive process steps are used, for example, compiled versions of the inference algorithms 306. To enable more efficient operation, the compiled algorithm may comprise calls to the uncertainty aware predictor 316. If the uncertainty aware predictor 316 returns a prediction with uncertainty meeting specified criteria then the compiled algorithm uses the prediction rather than computing the expensive process step (i.e. the a compiled version of one of the inference algorithms 306).

For example, the compiled algorithm 312 may comprise message passing operations and the uncertainty aware predictor 316 may take as input features of one or more messages reaching a specified type of factor node and predict features of a message output by the factor node as a result. In some examples the predictor takes parameters of variable to factor messages as input and predicts parameters of a factor to variable message.

In some examples there are a plurality of uncertainty aware predictors. For example, one for each factor node in a probabilistic graphical model for which it is desired to make the message computation efficient. The factor nodes for which it is desired to make the message computation efficient may be selected according to the type of the factor node. For some types of factor nodes, messages to variables can be computed easily, while for others, it is an extremely computationally expensive task. Therefore a predictor may be used for each factor node where the messages to variables are extremely computationally expensive to compute. For example, for any given factor node in a probabilistic graphical model, an individual predictor may learn an efficiently computable message generating function (predictor) computation function in an online fashion by seeing the messages that were computed by a time-consuming sampling based method.

The inference engine can be part of a system which observes the data 320 and uses it to compute inferences and control a system using the results. For example, a crowd-sourcing system 324, an information retrieval system 326, a recommendation system 328 or others.

Figure 4:
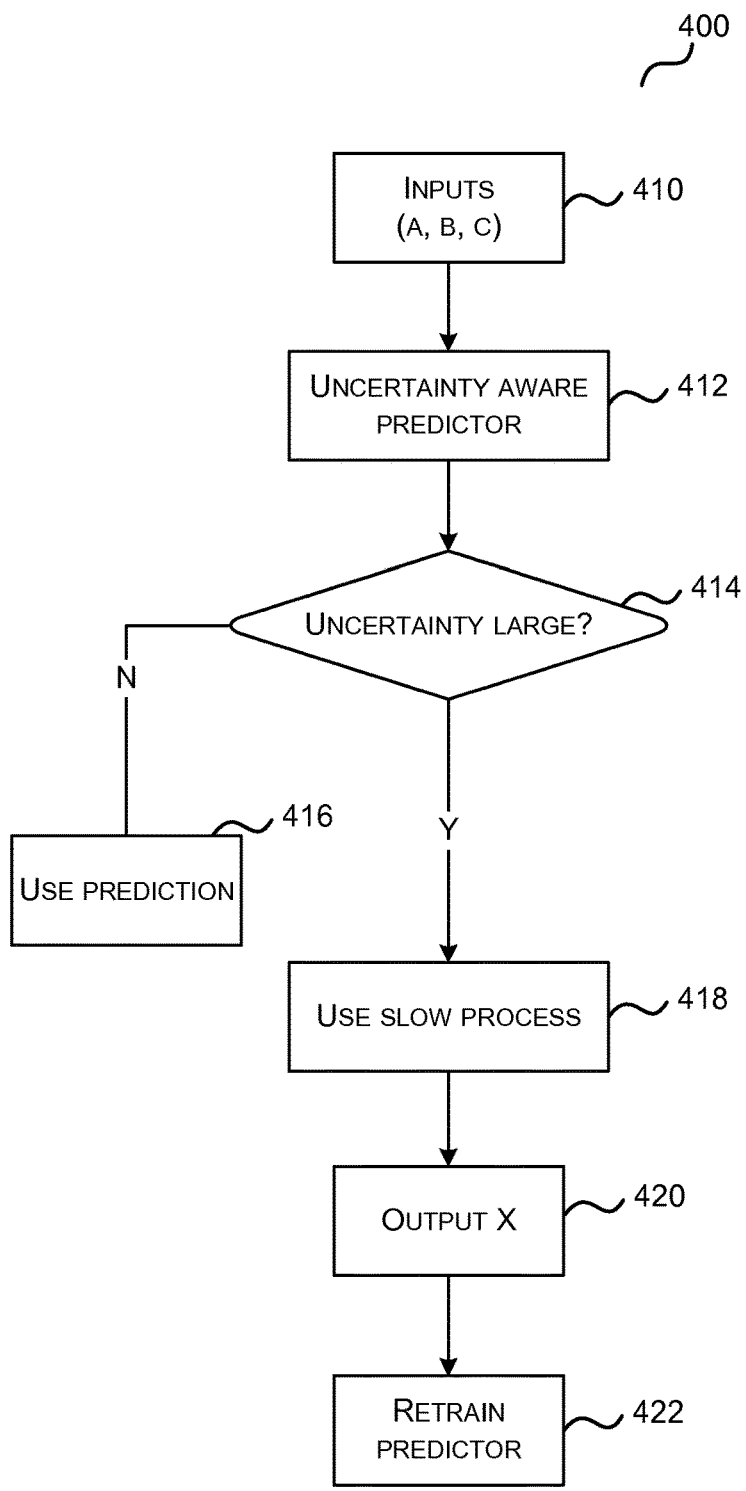
FIG. 4 is a flow diagram of a process at an inference engine with and without use of an uncertainty aware predictor.

FIG. 4 is a flow diagram of part of a method at the inference engine 100. The method of FIG. 4 is for one process step of process steps 108 of FIG. 1. That is, the method of FIG. 4 is repeated for each of the process steps 108.

Inputs to a process step are received 410 and sent to the uncertainty aware predictor 412. For example, there are three inputs, a, b and c in the FIG. 1 example. In the pose tracking example the inputs may be images in each of three color channels for a single frame captured by the camera. In a message passing example described with reference to FIG. 3 the inputs may be messages input to a factor node. Each message may comprise a plurality of statistics describing a probability distribution.

The uncertainty aware predictor computes a prediction from the inputs and also computes a measure of uncertainty of the prediction. The process for computing the prediction and the measure of uncertainty of the prediction may have relatively low computational complexity. The inference engine checks 414 if the uncertainty is large. If the uncertainty is large, the inference engine uses 418 the known process (indicated in FIG. 4 as slow process 418) to compute the process step. For example, the slow process computes the output of the process step as x (see box 420 of FIG. 4). The inference engine is then able to use the inputs a, b, c together with the output x as a training pair to retrain 422 the predictor.

If the uncertainty of the prediction is low, the inference engine uses the prediction 416 to compute the output of the process step.

A threshold used by the inference engine at decision point 414 may be pre-configured according to the application domain and/or the computing resources available. In some examples the threshold is dynamically adjusted according to the frequency of use of the slow process 418.

A non-exhaustive list of example of types of uncertainty aware predictor 114 is: support vector machine, neural network, random decision forest, jungle of directed acyclic graphs, ensemble of discriminative ferns, Gaussian process interpolator.

A support vector machine represents examples as points in space and divides the examples into categories using planes. Training examples are used to build the model that assigns new examples into the categories.

A random forest comprises a plurality of decision trees each having a root node, a plurality of split nodes and a plurality of leaf nodes. At test time (when a previously unseen example is applied to the already trained random forest) Image elements of an image may be pushed through trees of a random decision forest from the root to a leaf node in a process whereby a decision is made at each split node. The decision is made according to characteristics of the image element and characteristics of test image elements displaced therefrom by spatial offsets specified by the parameters at the split node. At a split node the image element proceeds to the next level of the tree down a branch chosen according to the results of the decision. The random decision forest may use regression or classification. One leaf node from each tree in the forest is reached and data stored at those leaf nodes during training is accessed. For example, this data comprises labeled training data in an aggregated form. The leaf node data found from each tree may be aggregated to produce a final output.

During training, parameter values (also referred to as features) are learnt for use at the split nodes and data is accumulated at the leaf nodes. For example, training data comprising labeled images are passed through the tree and split node test parameters are selected (from randomly generated possibilities) at each split node according to how well the split node test parameters deal with the training data at the split node. An information gain criterion or other well-known criterion may be used to assess how effectively the split node test parameters deal with the training data at the split node.

A decision jungle is a plurality of directed acyclic graphs configured as for a random decision forest, except that a plurality of the split nodes are merged together. That is, rather than being binary trees as in a random decision forest, the individual members of the jungle are directed acyclic graphs.

A discriminative fern ensemble is a plurality of look up tables containing aggregated training data indexed by index values where the aggregated training data (such as image labels in the case of image classification) and index values are learnt during a training phase. At test time the index values are computed from an unseen example, such as an image or a patch of image elements, (without the need to traverse a directed acyclic graph or decision tree) and used to look up aggregated training data from each fern table in the ensemble. The data looked up from each fern table is aggregated to calculate an output prediction, such as a distribution over class labels (in the case of a classification task).

A Gaussian process interpolator is a regressor where the interpolated values are modeled by a Gaussian process governed by prior covariances.

Figure 5:
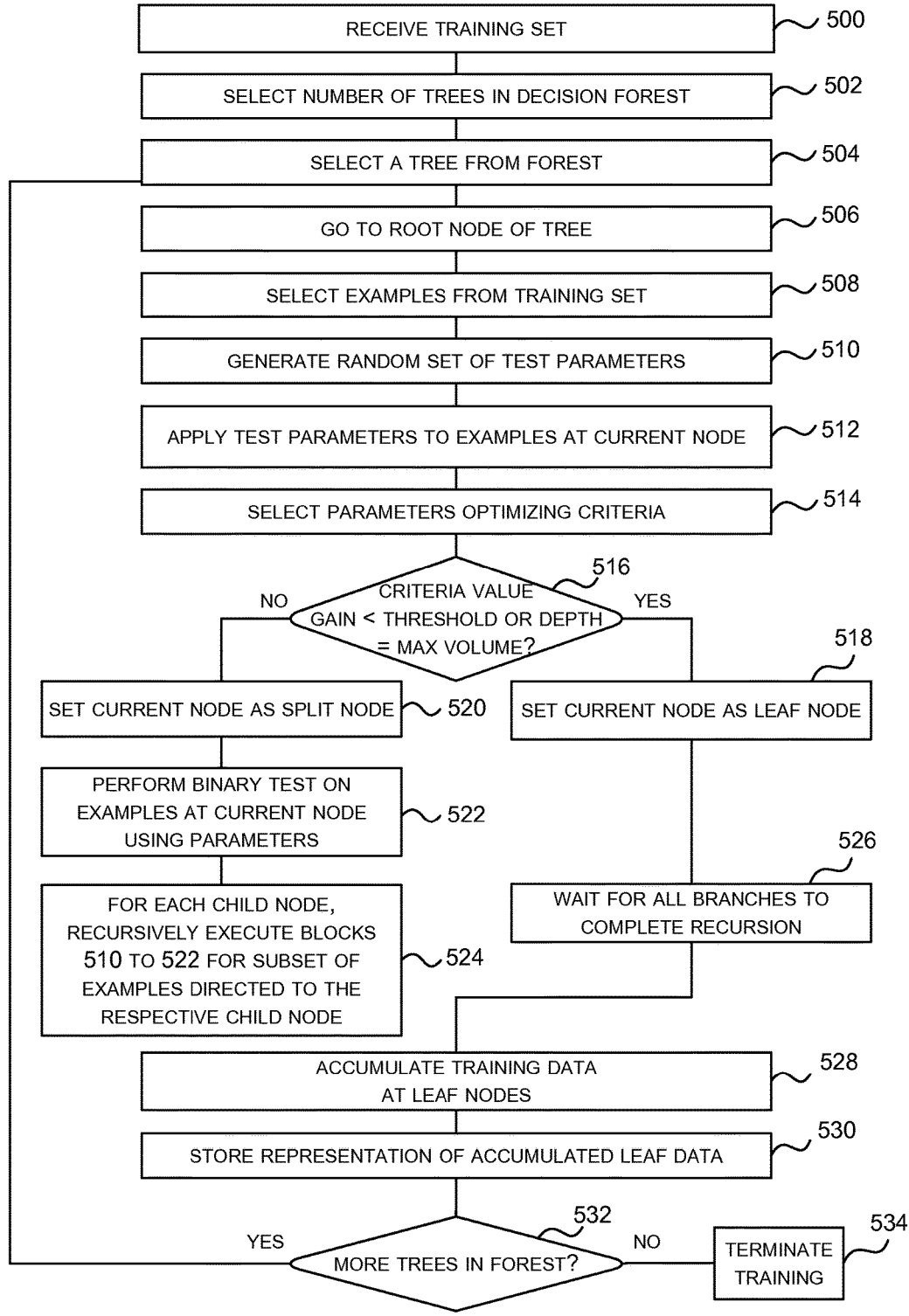
FIG. 5 is a flow diagram of a method of training a random decision forest for use as an uncertainty aware predictor.
Figure 6:
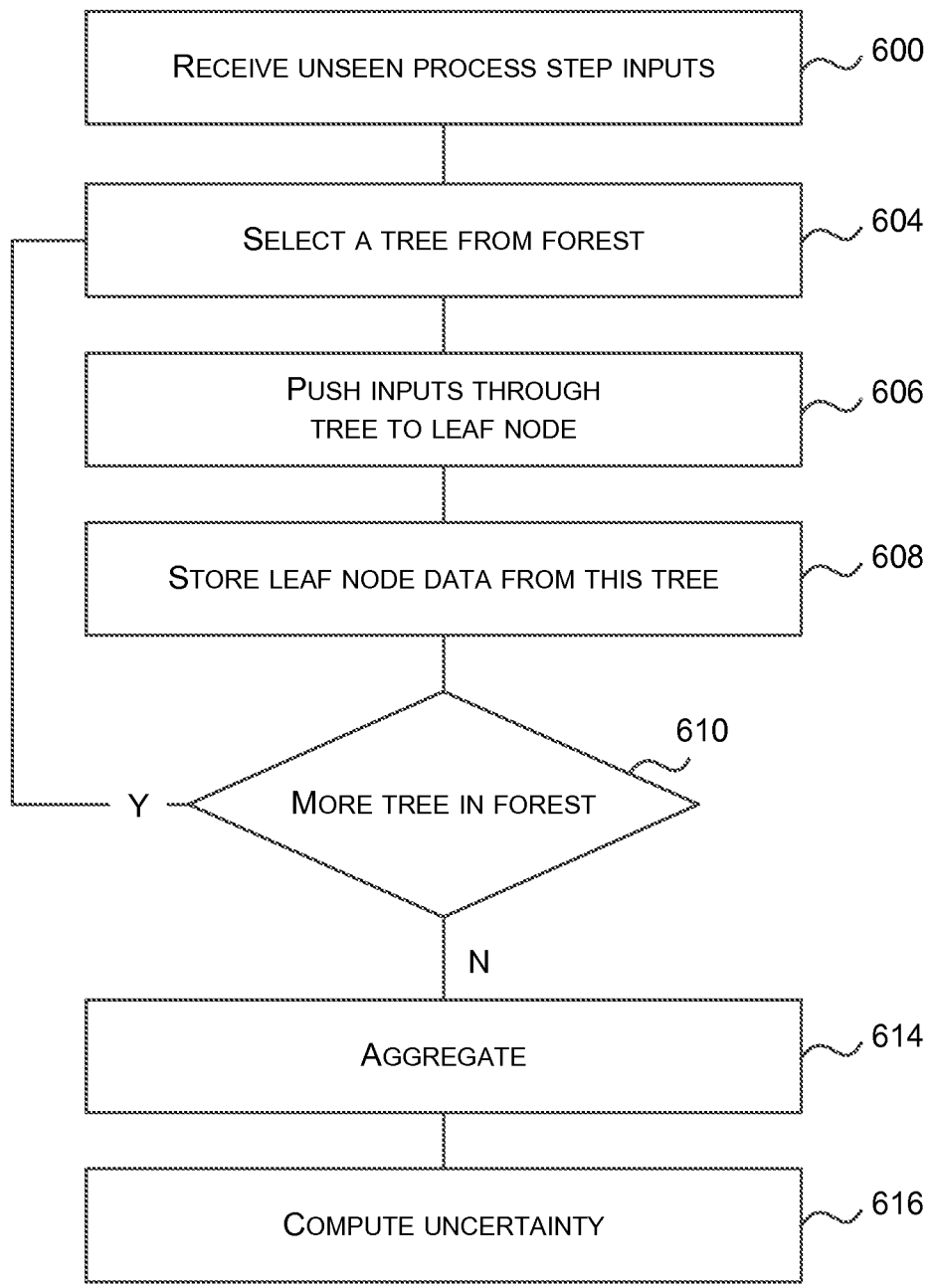
FIG. 6 is a flow diagram of a method of using a trained random decision forest as an uncertainty aware predictor.
Figure 7:
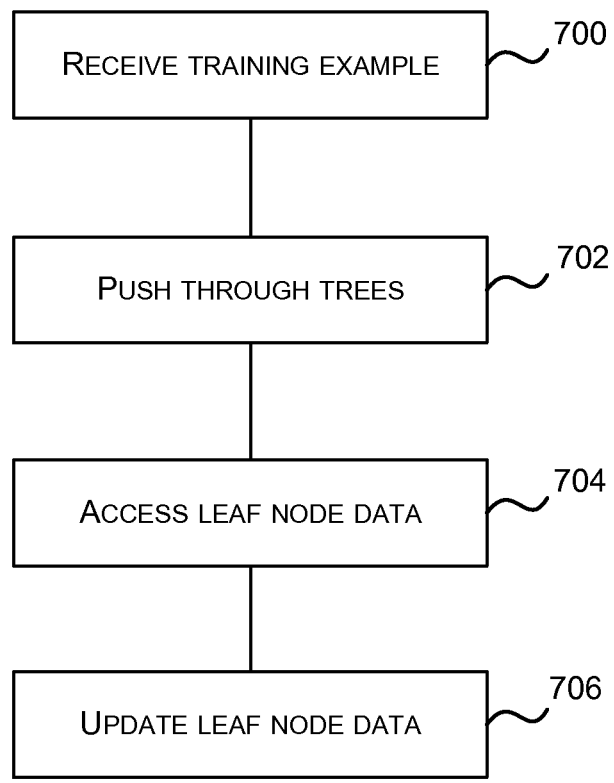
FIG. 7 is a flow diagram of a method of updating leaf node data of a random decision forest.

An example in which the uncertainty aware predictor 114 is a random decision forest is now given with reference to FIGS. 5,6 and 7. FIG. 5 describes a method of growing trees of a random decision forest in a training phase. FIG. 6 describes a method of using a trained random decision forest at test time. FIG. 7 describes a method of updating leaf node data of a random decision forest which has already been grown using the method of FIG. 5. For example, the method of FIG. 5 may be used to retrain the predictor at step 422 of FIG. 4. For example, the method of FIG. 6 may be used to compute a prediction and an uncertainty for use at decision point 414 of FIG. 4.

FIGS. 5 to 7 are first described with respect to the situation of FIG. 2 where frames of image data are processed. Later these figures are described with respect to the situation of FIG. 3 where each process step is equivalent to a factor node message passing computation of a probabilistic graphical model in an inference engine.

Referring to FIG. 5, to train the decision forest, a training set comprising frames of image data depicting a hand (or other object to have pose tracked) with labeled pose is received 500. The training set comprises images depicting a wide variety of different poses and may be obtained from empirically observed images or by synthetically generating images.

The number of decision trees to be used in a random decision forest is selected 502.

A decision tree from the decision forest is selected 504 (e.g. the first decision tree 500) and the root node 506 is selected 506. At least a subset of the image elements from each of the training images are then selected 508. For example, every other image element. Each selected image element of each training image is associated with a label indicating the pose of the hand (or other object).

A random set of test parameters are then generated 510 for use by the binary test performed at the root node as candidate features. In one example, the binary test uses a threshold and features which compare a reference image element with one or more probe image elements offset from the reference image element by randomly selected amounts. The threshold and the offset amounts are examples of test parameters.

Then, every combination of test parameter may be applied 512 to each image element in the set of training images. In other words, available values for the offsets are tried one after the other, in combination with available values of the thresholds for each image element in each training image. For each combination, criteria (also referred to as objectives) are calculated 514. In an example, the calculated criteria comprise the information gain (also known as the relative entropy). The combination of parameters that optimize the criteria (such as maximizing the information gain is selected 514 and stored at the current node for future use. As an alternative to information gain, other criteria can be used, such as Gini entropy, or the 'two-ing' criterion or others described.

It is then determined 516 whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set 518 as a leaf node. Similarly, the current depth of the tree is determined (i.e. how many levels of nodes are between the root node and the current node). If this is greater than a predefined maximum value, then the current node is set 518 as a leaf node. Each leaf node has pose data which accumulates at that leaf node during the training process as described below.

It is also possible to use another stopping criterion in combination with those already mentioned. For example, to assess the number of example image elements that reach the leaf. If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set 520 as a split node. As the current node is a split node, it has child nodes, and the process then moves to training these child nodes. Each child node is trained using a subset of the training image elements at the current node. The subset of image elements sent to a child node is determined using the parameters that optimized the criteria. These parameters are used in the binary test, and the binary test performed 522 on all image elements at the current node. The image elements that pass the binary test form a first subset sent to a first child node, and the image elements that fail the binary test form a second subset sent to a second child node.

For each of the child nodes, the process as outlined in blocks 510 to 522 of FIG. 5 are recursively executed 524 for the subset of image elements directed to the respective child node. In other words, for each child node, new random test parameters are generated 510, applied 512 to the respective subset of image elements, parameters optimizing the criteria selected 514, and the type of node (split or leaf) determined 516. If it is a leaf node, then the current branch of recursion ceases. If it is a split node, binary tests are performed 522 to determine further subsets of image elements and another branch of recursion starts. Therefore, this process recursively moves through the tree, training each node until leaf nodes are reached at each branch. As leaf nodes are reached, the process waits 526 until the nodes in all branches have been trained. Note that, in other examples, the same functionality can be attained using alternative techniques to recursion.

Once all the nodes in the tree have been trained to determine the parameters for the binary test optimizing the criteria at each split node, and leaf nodes have been selected to terminate each branch, then training data may be accumulated 528 at the leaf nodes of the tree. This is the training stage and so particular image elements which reach a given leaf node have specified pose known from the ground truth training data. A representation of the training data may be stored 530 using various different methods. Optionally sampling may be used to select training data to be accumulated and stored in order to maintain a low memory footprint. For example, reservoir sampling may be used whereby a fixed maximum sized sample of training data is taken. Selection may be random or in any other manner.

Once the accumulated training data have been stored it is determined 532 whether more trees are present in the decision forest. If so, then the next tree in the decision forest is selected, and the process repeats. If all the trees in the forest have been trained, and no others remain, then the training process is complete and the process terminates 534.

Therefore, as a result of the training process, one or more decision trees are trained using synthesized or empirical training images. Each tree comprises a plurality of split nodes storing optimized test parameters, and leaf nodes storing associated pose values or representations of aggregated pose values. Due to the random generation of parameters from a limited subset used at each node, the trees of the forest are distinct (i.e. different) from each other.

The training process may be performed in advance of using the trained prediction system to predict pose of an entity depicted in an image. The decision forest and the optimized test parameters may be stored on a storage device for use in predicting output of a process step at a later time.

FIG. 6 illustrates a flowchart of a process for predicting pose of an entity depicted in a previously unseen image using a decision forest that has been trained as described with reference to FIG. 5. Firstly, an unseen image is received 600. An image is referred to as 'unseen' to distinguish it from a training image which has the pose already specified.

An image element from the unseen image is selected 602. A trained decision tree from the decision forest is also selected 604. The selected image element is pushed 606 through the selected decision tree (in a manner similar to that described above with reference to FIG. 5), such that it is tested against the trained parameters at a node, and then passed to the appropriate child in dependence on the outcome of the test, and the process repeated until the image element reaches a leaf node. Once the image element reaches a leaf node, the accumulated pose values (from the training stage) associated with this leaf node are stored 608 for this image element.

If it is determined 610 that there are more decision trees in the forest, then a new decision tree is selected 604, the image element pushed 606 through the tree and the accumulated pose stored 608. This is repeated until it has been performed for all the decision trees in the forest. Note that the process for pushing an image element through the plurality of trees in the decision forest can also be performed in parallel, instead of in sequence as shown in FIG. 6.

It is then determined 612 whether further unanalyzed image elements are present in the unseen image, and if so another image element is selected and the process repeated. Once all the image elements in the unseen image have been analyzed, then pose is obtained for all image elements.

As the image elements are pushed through the trees in the decision forest, pose values accumulate. These accumulated pose values are aggregated 614 to compute a single pose output. Uncertainty of the aggregated pose value is also computed 616.

FIG. 7 describes a method of updating leaf node data of a random decision forest which has already been grown using the method of FIG. 5. For example, suppose the known process 110 has been computed and has calculated output x from inputs a, b and c. The random decision forest receives 700 a training data item comprising x and a, b, c. The training data item is pushed 702 through each tree of the forest to find one leaf node of each tree. This is done by applying the training example to the split node decisions, starting from a root node of each tree and moving through that tree to a leaf node. The leaf node data is accessed 704 for the one leaf node reached in each tree. For example, the leaf node data is aggregated pose values in the pose tracking example. The accessed leaf node data is updated 706 using the training example. For example, by including the training example in the aggregated pose values.

As mentioned above the methods of FIGS. 5 to 7 can be used where the process steps are steps of a probabilistic inference algorithm. For example, a process step receives inputs a, b, c which are each messages of a message passing algorithm. The inputs are denoted by the symbol $m_{in}$. The process step computes an output x which is also a message of a message passing algorithm. The output is denoted by the symbol $m_{out}$. Each set of incoming messages is represented in two ways: the first, a concatenation of the parameters of its constituent messages which is called herein the regression parameterization and is denoted by $r_{in}$ and the second, a vector of features computed on the set which is called herein the tree parameterization and denoted by $t_{in}$. The parameters of a message can be statistics describing a probability distribution, such as a mean and a variance. So $r_{in}$ can be a list of statistics describing probability distributions of input messages, a, b, c. The tree parameterization has parameters and moments and properties of the set of input messages as a whole. The outgoing message may be a vector of real value numbers $r_{out}$.

In the training method of FIG. 5 the training set comprises pairs of $m_{in}$ and $m_{out}$ data. For example, this data is obtained from the known process 110. Steps 500 to 508 proceed as described above. At step 510 a random set of test parameters is generated. For example, a random set of values of parameters of an oriented hyperplane split criterion denoted, at split node j, as $\tau_j$.

At step 514 the criteria used to select the parameters is an objective function which splits the training data at each node in a way that the relationship between the incoming and outgoing messages is well captured by a regression model fitted to the training examples which will reach each child node. For example, as measured by symmetrized marginal Kullback-Leibler divergence or in other ways. The regression model may be a polynomial of a specified degree (such as 2 or 3). Using this objective function gives benefits (as compared with a standard root-mean-squared error objective) because it is not sensitive to the way the distributions describing the groups of training examples reaching the left and right child nodes are parameterized. However, other criteria can be used such as mentioned above with reference to FIG. 5.

A symmetrized marginal Kullback-Leibler divergence is a measure of the difference between the marginal probability distribution of the output message computed by the predictor and the marginal probability distribution of the output message computed by the known process.

In the example of FIG. 5 the decision point 516 checks whether to set the current node as a split node or a leaf node. In the example where the process steps are steps of a probabilistic inference algorithm the decision point 516 may omit a check on the depth of the tree. That is, the trees may be grown to unlimited depth.

In the test time situation of FIG. 6 (for the case where the process steps are steps of a probabilistic inference algorithm), the inference engine receives 600 unseen process step inputs. It selects a tree from the forest 604 and pushes 606 the process step inputs (concatenated statistics $m_{in}$) through the tree to a leaf node. The inference engine stores 608 the leaf node data from the leaf node indexed on this tree and repeats the process for any more trees in the forest 610.

Combining the leaf node data indexed from each tree into a single forest prediction is achieved by computing a moment average at aggregation step 614. Using a moment average by averaging the first few moment of each predicted distribution across trees, and solving for the distribution parameters which match the averaged moments is found to give good results.

A measure of the uncertainty of the single forest prediction is computed 616. In some examples, the measure of uncertainty is computed by calculating a level of agreement between the predictions of the individual trees of the forest. For example, by calculating one standard deviation of the predictions made by the different trees in the forest. Empirical investigation finds that this uncertainty measure works well in practice. However, other measures of uncertainty may also be used. For example, where a Gaussian process interpolator is used as the predictor, the marginal variance associated with each prediction may be used as an estimate of uncertainty.

As mentioned above with reference to FIG. 4 a threshold uncertainty may be used to make the decision at box 414 about whether to use the prediction or the known process. An example of a method for empirically determining a threshold uncertainty to be used is now given, for the situation where the process steps are steps of a probabilistic inference algorithm.

A small number of training data examples are collected (comprising $m_{in}$, $m_{out}$ pairs) and divided into a training portion and an evaluation portion. The training portion is used to train the uncertainty aware predictor 114. The min values from the evaluation portion are used to compute predicted $m_{out}$ values from the trained uncertainty aware predictor, and also uncertainty measures. The predicted $m_{out}$ values are compared with the known $m_{out}$ values of the evaluation portion. The threshold uncertainty is then set so that so held out prediction has an error above a user-specified, problem-specific maximum tolerated value.

Figure 8:
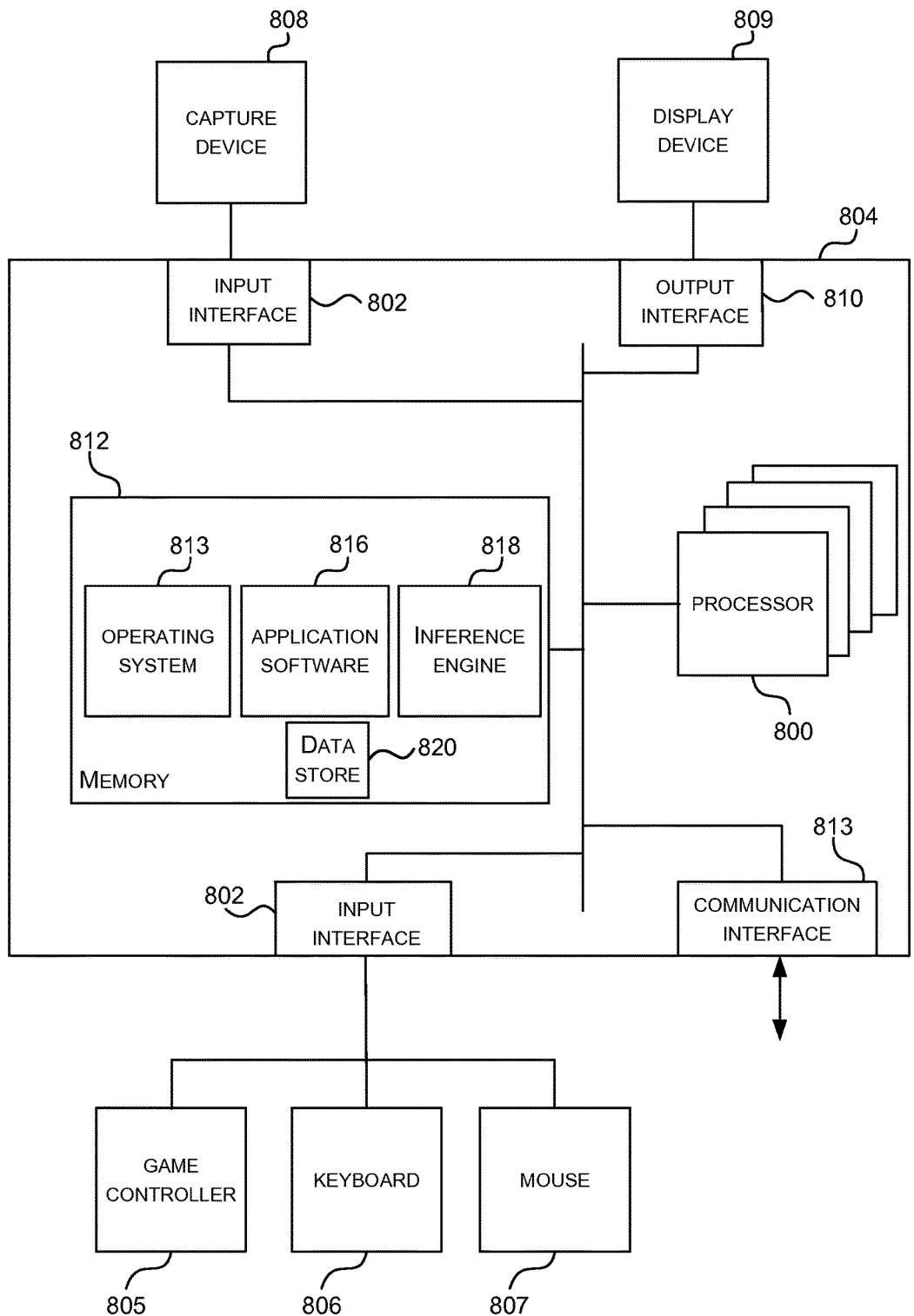
FIG. 8 is a schematic diagram of a computing-based device in which embodiments of an inference engine are implemented.

FIG. 8 illustrates various components of an exemplary computing-based device 804 which may be implemented as any form of a computing and/or electronic device, and in which embodiments of an inference engine may be implemented. For example, a mobile phone, a tablet computer, a wearable computer, a laptop computer, a personal computer, a web server, a cloud server.

Computing-based device 804 comprises one or more processors 800 which may be microprocessors, controllers or any other suitable type of processors for processing computer executable instructions to control the operation of the device in order to carry out inference in a fast, efficient manner. For example, as part of a tracker for tracking pose of an object such as a human hand, a body, or other object. For example, as part of a crowdsourcing system. For example, as part of an information retrieval system. For example, as part of a recommendation system. In some examples, for example where a system on a chip architecture is used, the processors 800 may include one or more fixed function blocks (also referred to as accelerators) which implement a part of the method of any of FIGS. 4 to 7 in hardware (rather than software or firmware). Platform software comprising an operating system 813 or any other suitable platform software may be provided at the computing-based device to enable application software 816 to be executed on the device. A data store 820 stores inference settings, thresholds, inference results and other data. In the case that the inference engine is part of a pose tracker the data store holds candidate poses, image data, tracked pose and/or other data. An inference engine 818 comprises instructions to execute a part of the method of any of FIGS. 4 to 7.

The computer executable instructions may be provided using any computer-readable media that is accessible by computing based device 804. Computer-readable media may include, for example, computer storage media such as memory 812 and communications media. Computer storage media, such as memory 812, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 812) is shown within the computing-based device 804 it will be appreciated that the storage may be distributed or located remotely and accessed via a network or other communication link (e.g. using communication interface 813).

The computing-based device 804 also comprises an output interface 810 arranged to output display information to a display device 809 which may be separate from or integral to the computing-based device 804. For example, in the case of a tablet computer the display device 804 is integral with the computing-based device. The display information may provide a graphical user interface. In some examples an input interface 802 is also arranged to receive and process input from one or more devices, such as a user input device (e.g. a mouse 807, keyboard 806, game controller 805) and from the capture device 808 described above. In some examples the user input device may detect voice input, user gestures or other user actions and may provide a natural user interface (NUI). In an embodiment the display device 809 may also act as a user input device if it is a touch sensitive display device. The output interface 810 may also output data to devices other than the display device, e.g. a locally connected printing device.

Any of the input interface 802, output interface 810, display device 809 and the user input device may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In examples there is an inference engine comprising:
a computation logic arranged to carry out a plurality of ordered process steps;
at least one uncertainty aware predictor having been trained to learn associations between inputs to one of the process steps and an output of the process step;
the computation logic arranged to, receive a plurality of inputs to one of the process steps, and obtain a predicted output and uncertainty of the prediction using the predictor; the computation logic arranged to select either the predicted output or a known output on the basis of the uncertainty, and, if the known output is selected, compute the known output and use the known output and the plurality of inputs of the step to train the predictor using online training.

In some examples the inputs to the process step comprise image data from a frame of an image capture device.

In some examples the inputs to the process steps comprise parameters of one or more probability distributions representing a probabilistically defined variable.

In examples where the inputs to the process step comprise image data as mentioned above, the predicted output may comprise a pose of an object depicted in the image data.

In some examples the predicted output comprises a factor to variable node message of a message passing algorithm.

In some examples, computing the known output is computationally resource intensive as compared with obtaining the predicted output and the uncertainty of the prediction.

In examples the uncertainty aware predictor comprises at least one of: a support vector machine, a neural network, a random decision forest, a jungle of directed acyclic graphs, an ensemble of discriminative ferns, a Gaussian process interpolator.

In some examples the uncertainty aware predictor comprises a first predictor and a second predictor, the first predictor having been trained to learn associations between inputs to one of the process steps and an output of the process step, and the second predictor having been trained to predict uncertainty associated with predictions of the first predictor.

Another example provides a method at an inference engine comprising:
executing a plurality of ordered steps to carry out inference on the basis of observed data;
for each step, receiving a plurality of inputs to the step, and computing a predicted output and uncertainty of the prediction using a predictor;
for each step, selecting either the predicted output or a known output on the basis of the uncertainty, and, if the known output is selected, computing the known output and retraining the predictor using the known output and the plurality of inputs of the step as training data.

For example, each of the steps comprises a message computation, each of the inputs being a message.

For example each ordered step is a model fitting algorithm for tracking pose of an entity depicted in captured image data.

In examples the predictor is any of a random decision forest, a discriminative fern ensemble, a jungle of directed acyclic graphs, a support vector machine.

In an example the predictor is a random decision forest having been trained using an objective function which splits the training data at split nodes of the trees of the forest in a way that the relationship between inputs to the step and an output is well captured by a polynomial regression fitted to training examples reaching each child of a split node.

In examples, computing the predicted output comprises inputting parameters of the inputs to the step to a random decision forest and aggregating results from a plurality of trees of the random decision forest using a moment average.

For example, retraining the predictor comprises pushing the training data through individual trees of a random decision forest and updating data stored at a leaf of each individual tree using the training data.

For example, selecting either the predicted output or the known output using a threshold uncertainty, the threshold uncertainty being pre-configured using training data.

Some examples comprise dynamically adjusting the threshold on the basis of frequency of selection of the known output.

An example provides one or more tangible device-readable media with device-executable instructions that, when executed by a computing system, direct the computing system to perform steps comprising:

executing a plurality of ordered steps to carry out inference on the basis of observed data;

for an individual step, receiving a plurality of inputs to the step, and computing a predicted output and uncertainty of the prediction using a predictor;

for the individual step, selecting either the predicted output or a known output on the basis of the uncertainty, and, if the known output is selected, computing the known output and retraining the predictor using the known output and the plurality of inputs of the step as training data.

For example, computing the known output is computationally resource intensive as compared with obtaining the predicted output and the uncertainty of the prediction.

In some examples, each of the steps comprises a message computation, each of the inputs being a message.

In some examples, each ordered step is a model fitting algorithm for tracking pose of an entity depicted in captured image data.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A system comprising:
one or more processors; and
memory storing computer executable instructions that, when executed by the one or more processors, cause the system to:
for each process step of the plurality of ordered process steps:
receive a plurality of inputs to the process step;
obtain a predicted output and an uncertainty of the predicted output using a predictor, wherein the predictor is trained to learn associations between one or more inputs to the process step and an output of the process step;
determine that the uncertainty of the predicted output is less than a threshold uncertainty;

select the predicted output instead of a known output based at least in part on the uncertainty of the predicted output being less than the threshold uncertainty, wherein the known output is generated using a first process that is more resource-intensive than a second process used to generate the predicted output; and control a computing system using the predicted output.

2. The system of claim 1 wherein the plurality of inputs to the process step comprise image data from a frame of an image capture device.

3. The system of claim 1 wherein the plurality of inputs to the process step comprise parameters of one or more probability distributions representing a probabilistically defined variable.

4. The system of claim 2 wherein the predicted output comprises a pose of an object depicted in the image data.

5. The system of claim 3 wherein the predicted output comprises a factor to variable node message of a message passing algorithm.

6. The system of claim 1 wherein each step of the plurality of ordered steps comprises a message computation, and each input of the plurality of inputs comprises a message.

7. The system of claim 1 wherein the predictor comprises a first predictor and a second predictor, the first predictor having been trained to learn the associations between the one or more inputs to the process step and the output of the process step, and the second predictor having been trained to predict uncertainty associated with predictions of the first predictor.

8. A method comprising:

executing, by one or more processors, a plurality of ordered steps to carry out inference on the basis of observed data;

for each step of the plurality of ordered steps:
  receiving a plurality of inputs to the step;
  computing a predicted output and an uncertainty of the predicted output using a predictor;
  determining that the uncertainty of the predicted output is less than a threshold uncertainty;
  selecting the predicted output instead of a known output based at least in part on the uncertainty of the predicted output being less than the threshold uncertainty, wherein the known output is generated using a first process that is more resource-intensive than a second process used to generate the predicted output;
  and-controlling a computing system using the predicted output.

9. The method of claim 8 wherein each step of the plurality of ordered steps comprises a message computation, and each input of the plurality of inputs comprises a message.

10. The method of claim 8 wherein each step of the plurality of ordered steps is a model fitting algorithm for tracking pose of an entity depicted in captured image data.

11. The method of claim 8 wherein the predictor is at least one of a random decision forest, a discriminative fern ensemble, a jungle of directed acyclic graphs, or a support vector machine.

12. The method of claim 8 wherein the predictor is a random decision forest having been trained using an objective function which splits training data at split nodes of trees of the random decision forest in a way that a relationship between inputs to the step and an output is captured by a polynomial regression fitted to training examples reaching each child of a split node.

13. The method of claim 8 wherein computing the predicted output comprises inputting parameters of the plurality of inputs to the step to a random decision forest and aggregating results from a plurality of trees of the random decision forest using a moment average.

14. The method of claim 8 wherein the threshold uncertainty is pre-configured using training data.

15. The method of claim 14 further comprising dynamically adjusting the threshold uncertainty based at least in part on a frequency of selection of the known output.

16. One or more computer storage media storing device-executable instructions that, when executed by a computing system, direct the computing system to perform steps comprising:

executing a plurality of ordered steps to carry out inference on the basis of observed data;

for an individual step of the plurality of ordered steps:
  receiving a plurality of inputs to the step;
  computing a predicted output and an uncertainty of the predicted output using a predictor;
  determining that the uncertainty of the predicted output is less than a threshold uncertainty;
  selecting the predicted output instead of a known output based at least in part on the uncertainty of the predicted output being less than the threshold uncertainty, wherein computing the known output is computationally resource-intensive as compared with computing the predicted output;
  and controlling a particular computing system using the predicted output.

17. The one or more computer storage media of claim 16 wherein the plurality of inputs to the process step comprise image data from a frame of an image capture device.

18. The one or more computer storage media of claim 16 wherein each step of the plurality of ordered steps comprises a message computation, and each input of the plurality of inputs comprises a message.

19. The one or more computer storage media of claim 16 wherein each step of the plurality of ordered steps is a model fitting algorithm for tracking pose of an entity depicted in captured image data.

20. The one or more computer storage media of claim 16 wherein the particular computing system comprises at least one of an augmented reality system or a game system.

* * * * *